3,799,897
PROCESS FOR MANUFACTURING SELF-EXTIN-
GUISHING POLYURETHANE FOAMS
Satomi Suzuki, Tokyo, Osamu Fujii, Konosu, Hirokazu
 Wakabayashi and Toshio Kishimoto, Kawagoe, and
 Masashi Numabe, Tokyo, Japan, assignors to Toyo
 Rubber Chemical Industrial Corporation, Tokyo, Japan
No Drawing. Continuation-in-part of abandoned applica-
 tion Ser. No. 63,012, Aug. 11, 1970. This application
 June 20, 1972, Ser. No. 264,434
Int. Cl. C08g 22/46
U.S. Cl. 260—2.5 AJ
3 Claims

ABSTRACT OF THE DISCLOSURE

A process for manufacturing polyurethane foams by reacting a polyhydroxyl compound containing at least two hydroxyl groups with an isocyanate compound in the presence of a foaming agent through catalysis by an organic amine compound, characterized in that said reaction for forming polyurethane foams is conducted in the presence of a flameproof composition comprising chlorinated paraffin and antimony oxide bearing a weight ratio ranging between 1:0.05 and 1:7, said flameproof composition being used in the range from 20 to 200 parts by weight per 100 parts by weight of said polyhydroxyl compound and being preliminarily mixed with part of the polyhydroxyl compound.

CROSS-REFERENCE TO RELATED APPLICATION

This is a continuation-in-part of the U.S. patent application Ser. No. 63,012, filed Aug. 11, 1970, and now abandoned.

BACKGROUND OF THE INVENTION

This invention relates to a process for manufacturing prominently self-extinguishing polyurethane foams.

One of the most serious drawbacks of polyurethane foams is that it is quite flammable. There have heretofore been made various attempts to provide flameproof polyurethane foams. One of these attempts consisted in treating polyurethane foams, after it was made into a desired form of product, with the same self-extinguishing agent as is used in many other articles. This prior method which additionally required a self-extinguishing treatment resulted in increased cost.

Another attempt to manufacture flameproof polyurethane foams included a step of incorporating a flameproof agent in the polyurethane. However, this method was impractical due to the generally low storage stability of many self-extinguishing agents, for example, compounds of phosphorus. A further disadvantage common to these conventional processes was that the amounts of self-extinguishing agent were subject to a certain limit which were applicable insofar as the desired properties of the resultant article were not excessively deteriorated, so that the self-extinguishability of such article was not appreciably higher than that of an untreated product.

A still further prior method consisted in preparing flame-resistant polyurethane foams from a polyhydroxyl compound and organic polyisocyanate, either or both of which contained phosphorus or halogen atoms. This last mentioned method had the drawback that the polyhydroxyl compound and organic polyisocyanate containing the atoms of phosphorus or halogens were far more expensive due to the very much complicated manufacturing process than ordinary polyhydroxyl compounds and organic polyisocyanates, thus considerably increasing the cost of the final product over that of a similar product customarily prepared.

SUMMARY OF THE INVENTION

The object of the present invention is to provide an inexpensive and economically advantageous process for manufacturing polyurethane foams having markedly improved fire-proofness and excellent physical properties.

The present invention provides a process for manufacturing self-extinguishing polyurethane foams wherein a polyhydroxyl compound is reacted with an isocyanate compound in the presence of an organic amine compound, a foaming agent and a flameproof composition of chlorinated paraffin and antimony oxide mixed in a weight ratio ranging from 1:0.05 to 1:7, said flameproof composition being preliminarily mixed with a portion of the polyhydroxyl compound in a weight ratio ranging from 2:1 to 10:1 and used ultimately in the range from 20 to 200 parts by weight per 100 parts by weight of the polyhydroxyl compound.

An important feature of the process according to the present invention is that the flameproof composition consisting of chlorinated paraffin and antimony trioxide bearing the above-mentioned weight ratio is used in the ratio of 20 to 200 parts by weight per 100 parts by weight of the polyhydroxyl compound wherein said flameproof composition is premixed with part of the polyhydroxyl compound in the ratio ranging from twice to ten times the amount of the latter. Such ratio of the flameproof composition o to the polyhydroxyl compound is much higher than in the conventional process for manufacturing flameproof polyurethane foams, resulting in the markedly improved flameproofness of the resultant product. Contrary to the general concept that increased addition of flameproof agent degrades the physical properties of polyurethane foams it has been verified surprisingly that the product obtained by the process of the present invention is not substantially inferior in physical properties to other polyurethane articles lacking a flameproof agent. The polyurethane foams prepared by the method of the present invention satisfactorily meets a variety of applications due to its excellent physical properties and self-extinguishability.

The polyhydroxyl compound available for the process of the present invention may consist of the same kind of polyester or polyether having a free hydroxyl group, or a mixture thereof as is used in manufacturing ordinary non-flameproof polyurethane foams. A preferred polyester is a type prepared by reacting organic acids, such as phthalic, adipic acid, dimerized linoleic acid and maleic acid, with polyhydric alcohols, such as ethylene glycol, propylene glycol, butylene glycol, diethylene glycol, trimethylolpropane and glycerin. The polyethers which may be advantageously employed in the process of the present invention include poly (oxypropylene) glycol, poly (oxybutylene) glycol, poly (oxytetramethylene) glycol and poly (oxypropylene) triol. Further, diols or triols derived from sorbitol or sucrose may be used as polyethers.

The isocyanate compounds which are reacted according to the present invention with the aforesaid polyesters or polyethers or their mixtures to form polyurethane include 2,4-toluene diisocyanate, 2,6-toluene diisocyanate, 1,5-naphthalene diisocyanate, p-phenylene diisocyanate, 4,4'-diphenyl diisocyanate, hexamethylene diisocyanate, 2-chloro-1, 4-phenyl diisocyanate and 4,4'-diphenylmethane diisocyanate. It will be apparent, however, that these compounds are only given by way of illustration and may consist of any others generally used in preparing polyurethane foams.

The catalyst for reaction of polyhydroxyl compounds with isocyanate compounds to form polyurethane according to the present invention may consist of any organic amine catalyst customarily used in such reaction. Particularly useful amine catalysts are triethylene diamine and n-ethyl morpholine. When it is desired to obtain porous polyurethane foams, there is used a composite catalyst comprising amines and organic tin compounds together with suitable foaming agents, such as water or fluorine-containing compounds. A typical organic compounds is stannous octoate.

Since selection of the kinds and proportions of these amine catalysts or composite catalysts consisting of amines and organic tin compounds to be used in the aforesaid reaction is apparent to those skilled in the art, description thereof is omitted.

In the process according to the present invention for manufacturing flameproof polyurethane foams, reaction of polyhydroxyl compounds with isocyanate compounds catalyzed by amines and/or organic tin compounds is conducted in the presence of a flameproof composition consisting of chlorinated paraffin and antimony oxide bearing a weight ratio ranging between 1:0.05 and 1:7, said flameproof composition being used in the range of 20 to 200 parts by weight, or preferably, from 20 to 100 parts by weight per 100 parts by weight of the polyhydroxyl compound. Said flameproof composition is preliminarily mixed with polyhydroxyl compound in a mixing ratio ranging from 2:1 to 10:1. The flameproof composition now containing polyhydroxyl compound is preferably added directly to the reaction mixture of a reaction catalyst, a foaming agent, a polyhydroxyl compound and an isocyanate compound, but can instead be diluted with the polyhydroxyl compound of the reaction mixture.

The reason for the above-mentioned preliminary mixing of flameproof composition with a proper amount of polyhydroxyl compound is based on the following finding. When said less than two parts of said flameprof composition is added to one part of polyhydroxyl compound (i.e. when the flameproof composition is mixed with a relatively large amount of the polyhydroxyl compound), chlorinated paraffin in the flameproof composition shows an excellent affinity with the polyhydroxyl compound and fully disperses into the polyhydroxyl compound, but antimony oxide, which is relatively large in specific gravity, exhibits a poor affinity with the polyhydroxyl compound and fails to disperse into and precipitates. Antimony oxide under such conditions cannot bring about full synergistic effects with chlorinated paraffin to impart self-extinguishability to the resultant polyurethane foams, but rather degrades sharply the physical properties of the resultant polyurethane foams.

Such undesirable precipitation of antimony oxide can be prevented by preliminary mixing of the flameproof composition and the polyhydroxyl compound in a ratio ranging from 2:1 to 10:1. If the flameproof composition is premixed with the polyhydroxyl compound according to the present invention, there will be formed crumbled structures of chlorinated paraffin-antimony oxide in the polyhydroxyl compound; no precipitation of antimony oxide will occur. Being dispersed in the polyhydroxyl compound, the crumbled structures of chlorinated paraffin-antimony oxide can be easily dispersed also into the reaction mixture of polyhydroxyl and isocyanate compounds when added thereto. Consequently, the resultant polyurethane foams will have an excellent self-extinguishability without degrading its other physical properties.

It should be noted that more than ten parts of the flameproof composition should not preliminarily be added to one part of the polyhydroxyl compound. Otherwise, chlorinated paraffin, having a high viscosity, will not be fully mixed and thoroughly dispersed into the polyhydroxyl compound. It has been verified that the method of the present invention provides polyurethane foam which has not only good self-extinguishability but also such physical properties as are equal to, and in some phases even higher than, those of the corresponding polyurethane foams to which there is not added any flameproof composition.

A combination of halogenated hydrocarbons and antimony trioxide itself is already known as one of useful flameproof compositions. However, it has heretofore been considered that the presence of said composition will deteriorate the physical properties of polyurethane foams, and in consequence a maximum proportion of said composition should be limited to 10 parts by weight at most per 100 parts by weight of the polyhydroxyl compound in order to obtain polyurethane foams having useful physical properties. However, it has been surprisingly discovered that when used according to the present invention at the rate of 20 to 200 parts per 100 parts by weight of a polyhydroxyl compound, the above-mentioned flameproof composition prepared from chlorinated paraffin and antimony trioxide enable polyurethane foams to be produced not only with high self-extinguishability but also with good physical properties. It is well assumed that it becomes possible with the present invention to add more flameproof composition to the polyhydroxyl compound than previously thought to be addable without degrading the physical properties of the resultant polyurethane foams, because chlorinated paraffin and antimony oxide in the flameproof composition of this invention are fully dispersed into the polyhydroxyl compound.

The ratio of the chlorinated paraffin to the antimony trioxide in the flameproof composition is selected to range from 1:0.05 to 1:7, or preferably from 1:0.1 to 1:5. The ratio of the antimony trioxide to the chlorinated paraffin has a great bearing on the desired self-extinguishability of the resulting polyurethane foams. Namely, the higher the ratio, the more elevated the self-extinguishability of the resultant product. However, use of the antimony trioxide alone does not bring about a desired flameproof effect.

Preferable chlorinated paraffins to be used with antimony trioxide are chlorinated paraffins having 24 carbon atoms and 6 to 21 chlorine atoms. Chlorinated paraffins are advantageous in that they are easily prepared with a high chlorine content. This advantage is further increased by the fact that many chlorinated paraffins are liquids soluble in the polyhydroxyl compound used as one of the reactants. However, chlorinated paraffins containing more than 70 percent by weight of chlorine which remain solid at room temperature may also be used to advantage.

The excellent self-extinguishability and physical properties of polyurethane foams according to the present invention will be more clearly understood from the examples which follow. Throughout these examples, parts are by weight.

EXAMPLE 1

A mixture having the following composition was injected into a mold at room temperature by the conventional one-shot injection. Upon completion of foaming, the injected mixture was cured 15 minutes at about 100° C. Chlorinated paraffins and antimony trioxide shown below are fully premixed with 15 parts of the trifunctional polyether and then incorporated into the mixture of other components.

| | Parts |
|---|---|
| Trifunctional polyether (average molecular weight: 3000) | 100 |
| Triethylene diamine | 0.2 |
| Stannous octoate | 0.9 |
| n-Ethyl morpholine | 0.4 |
| Water | 5.0 |
| Silicone oil | 2.0 |
| Methylene chloride | 2.0 |
| Trichloro-monofluoromethane | 2.0 |
| Chlorinated paraffin #65 (chlorine content: 65%) | 20 |
| Chlorinated paraffin #40 (chlorine content: 40%) | 20 |
| Antimony trioxide | 10 |
| 2,4-/2,6-toluene diisocyanates (ratio of 2,4 to 2,6 80:20) | 63.0 |

The properties of the porous flexible polyurethane foam obtained are shown in the following Table 1. There are also presented in Table 1 by way of comparison the properties of similar polyurethane foam not containing chlorinated paraffins and antimony trioxide, and those of ordinary porous self-extinguishing polyurethane foam prepared from an isocyanate compound having phosphorus atoms. The distance and time of combustion given in Table 1 were measured in accordance with ASTM D–1692–59T.

TABLE 1

|  | Polyurethane foam | | |
| --- | --- | --- | --- |
|  | Example 1 | Not containing chlorinated paraffin Sb$_2$O$_3$ | Prepared from phosphorus-containing isocyanate |
| Specific gravity (g./cm.$^3$) | 0.026 | 0.018 | 0.027 |
| Combustion distance (mm.) | 2–15 | Combustible | 20–80 |
| Combustion time (sec.) | 3–23 |  | 15–85 |
| Tensile strength (kg./cm.$^2$) | 1.1 | 1.2 | 1.1 |
| Tear strength (kg./cm.) | 0.26 | 0.7 | 0.59 |
| Elongation (percent) | 202 | 170 | 150 |
| Permanent stress (percent) | 3.9 | 2.0 | 10 |
| Compressibility (percent) | 40 | 33 | 24 |

As apparent from the above data, the polyurethane foam of the present invention has slightly inferior physical properties to a comparable product not containing a flameproof composition consisting of chlorinated paraffin and antimony trioxide, but prominently superior physical properties to a comparable product prepared from a phosphorus-containing isocyanate compound. Moreover, the product of the invention has such a markedly improved self-extinguishability as is unrealizable by the conventional self-extinguishing polyurethane foams. What deserves particular notice is that incorporation of a mixture of chlorinated paraffin and Sb$_2$O$_3$ prominently improved the feel characteristics of the product, as proved by the separately conducted feel test. The porous polyurethane foam of the invention feels very soft and flexible. This constitutes a distinct contrast to the fact that the prior art self-extinguishing polyurethane foam has extremely unfavorable feel characteristics, as compared with ordinary non-flameproof polyurethane foams.

EXAMPLE 2

Several runs were carried out using the composition of Example 1 wherein, however, the proportions of chlorinated paraffins #65 and #40 and antimony trioxide were changed. The properties of the porous polyurethane foams products obtained by these runs are shown in the following Table 2. Chlorinated paraffins and antimony trioxide shown below are fully premixed with 10 parts of trifunctional polyether and then incorporated into the mixture of other components.

The above data clearly show that even where the proportions of chlorinated paraffin and antimony trioxide were varied over a broad range, there were obtained polyurethane foams having good self-extinguishability.

EXAMPLE 3

There was prepared porous polyurethane from the undermentioned composition by the same one-shot method as used in Example 1.

| | Parts |
| --- | --- |
| Trifunctional polyester (average molecular weight: 3000) | 90 |
| Triethylene diamine | 0.18 |
| Stannous octoate | 0.67 |
| n-Ethyl morpholine | 0.35 |
| Water | 3.5 |
| Silicone oil | 2.0 |
| Chlorinated paraffin #65 [1] | 20 |
| Chlorinated paraffin #40 [1] | 20 |
| Antimony trioxide [1] | 8.0 |
| Trifunctional polyester (average molecular weight: 3000) [1] | 10.0 |
| 2,4-/2,6-toluene diisocyanates (ratio of 2,4 to 2,6 80:20) | 47.1 |

[1] These components were preliminarily mixed and then incorporated.

A soft porous urethane foam obtained had a specific gravity of 0.0398 g./cm.$^3$ and displayed the same physical properties and self-extinguishability as in Example 1.

EXAMPLE 4

47.7 parts of 2,4-/2,6-toluene diisocyanates (ratio of 2,4 to 2,6 80:20) were slowly added to 100 parts of trifunctional polyester (average molecular weight: 3000). Upon completion of addition, the mixture was agitated about 3 hours at 80° C., obtaining a prepolymer containing 12.1 percent of NCO. To 100 parts of the prepolymer were added the following components.

| | Parts |
| --- | --- |
| Triethylene diamine | 0.32 |
| Silicone oil | 2.1 |
| Stannous octoate | 1.0 |
| Trichloro-monofluoroethylene | 2.0 |
| Water | 4.5 |
| Chlorinated paraffin #65 [1] | 30 |
| Antimony trioxide [1] | 8 |
| Trifunctional polyester (average molecular weight: 3000) [1] | 5.0 |
| 2,4-/2,6-toluene diisocyanates (ratio of 2,4 to 2,6 80:20) | 21.7 |

[1] These components were preliminarily mixed and then incorporated.

There was obtained a soft porous polyurethane foam having the same physical properties and self-extinguishability as in Example 1 and a specific gravity of 0.030.

EXAMPLE 5

There was prepared a porous polyurethane foam from the following components by one-shot injection.

TABLE 2

| Run | 1 | 2 | 3 | 4 | 5 |
| --- | --- | --- | --- | --- | --- |
| Chlorinated paraffin #65 | 20 | 20 | 20 | 20 | 10 |
| Chlorinated paraffin #40 | 20 | 20 | 20 | 10 | 10 |
| Sb$_2$O$_3$ | 8 | 5 | 3 | 20 | 20 |
| Specific gravity (kg./cm.$^3$) | 0.0255 | 0.025 | 0.0243 | 0.027 | 0.026 |
| Combustion distance (cm.) | 5–20 | 7–26 | 9–33 | 0.5–10 | 0.5–10 |
| Combustion time (sec.) | 5–26 | 5–31 | 7–39 | 0.5–11 | 0.5–13 |
| Tensile strength (kg./cm.$^2$) | 1.1 | 1.1 | 1.15 | 0.90 | 0.95 |
| Tear strength (kg./cm.) | 0.65 | 0.69 | 0.72 | 0.58 | 0.61 |
| Elongation (percent) | 198 | 201 | 203 | 155 | 165 |
| Permanent stress (percent) | 3.5 | 3.2 | 2.7 | 5.5 | 49 |
| Compression (percent) | 38 | 39 | 40 | 33 | 35 |

| | Parts |
|---|---|
| Trifunctional polyether (average molecular weight: 3350) | 90 |
| Triethanol amine | 10 |
| Triethylene diamine | 0.35 |
| Stannous octoate | 0.95 |
| Water | 3.0 |
| Silicone oil | 0.2 |
| Chlorinated paraffin #65 [1] | 35 |
| Antimony trioxide [1] | 10 |
| Trifunctional polyester (average molecular weight: 3350) [1] | 10 |
| Hexamethylene diisocyanate | 88 |

[1] These components were preliminarily mixed and then incorporated.

The physical properties of a porous semi-hard polyurethane foam obtained (specific gravity: 0.108 g./cm.$^3$) were as follows:

| | | |
|---|---|---|
| Tensile strength | kg./cm.$^2$ | 0.95 |
| Elongation | percent | 80 |
| Permanent stress | do | 28 |

EXAMPLE 6

There was obtained a hard porous polyurethane foam by stirring the following composition at room temperature.

| | Parts |
|---|---|
| Sucrose-base polyfunctional polyether | 25.0 |
| Trichloro-monofluoroethane | 13.0 |
| Silicone oil | 0.25 |
| p-Phenylene diisocyanate | 50 |
| Chlorinated paraffin #65 [1] | 25 |
| Antimony trioxide [1] | 12 |
| Sucrose-base polyfunctional polyether [1] | 7.5 |

[1] These components were preliminarily mixed and then incorporated.

The resultant polyurethane foam had the same physical properties as that which lacked chlorinated paraffin and antimony trioxide, and the same self-extinguishability as in Example 1.

| | Kg./cm.$^2$ |
|---|---|
| 100% modulus | 106 |
| Tensile product | 356 | and additionally excellent self-extinguishability.

What we claim is:

1. In a process for manufacturing self-extinguishing polyurethane foams wherein a polyhydroxyl compound is reacted with an isocyanate compound in the presence of an organic amine compound, a foaming agent and a flameproof composition consisting of chlorinated paraffin and antimony oxide mixed in a weight ratio ranging from 1:0.05 to 1:7 the improvement wherein said flameproof composition is preliminarily mixed with part of said polyhydroxyl compound in a weight ratio ranging from 2:1 to 10:1 and used ultimately in the range from 20 to 200 parts by weight per 100 parts by weight of said polyhydroxyl compound.

2. A process as claimed in claim 1 wherein said flameproof composition is used in a range from 20 to 100 parts by weight per 100 parts by weight of said polyhydroxyl compound.

3. A process as claimed in claim 1 wherein the chlorinated paraffin is chlorinated hydrocarbon having 6 to 21 chlorine atoms.

References Cited

UNITED STATES PATENTS

| 3,164,558 | 1/1965 | Eichhorn | 260—33.8 UB |
| 3,294,710 | 12/1966 | Rosenberg | 260—28 |
| 3,102,875 | 9/1963 | Heiss | 260—28 |
| 3,075,928 | 1/1963 | Lanham | 260—2.5 AJ |

MORRIS LIEBMAN, Primary Examiner

P. R. MICHL, Assistant Examiner

U.S. Cl. X.R.

260—28, 33.8 UB

UNITED STATES PATENT OFFICE
CERTIFICATE OF CORRECTION

Patent No. 3,799,897      Dated March 26, 1974

Inventor(s) Satomi Suzuki, O. Fujii, H. Wakabayashi, T. Kishimoto and M. Numabe

It is certified that error appears in the above-identified patent and that said Letters Patent are hereby corrected as shown below:

Claims priority, application Japan, Oct. 3, 1969
78708

Signed and sealed this 16th day of July 1974.

(SEAL)
Attest:

McCOY M. GIBSON, JR.      C. MARSHALL DANN
Attesting Officer      Commissioner of Patent